No. 646,737.  
J. HOWE.  
FISHING REEL AND REEL REST.  
(Application filed Nov. 22, 1899.)  
Patented Apr. 3, 1900.

(No Model.)  
2 Sheets—Sheet 1.

WITNESSES:  
Geo. W. Naylor  
J. Fred Acker

INVENTOR  
Jasper Howe  
BY  
Munn  
ATTORNEYS

No. 646,737. Patented Apr. 3, 1900.
J. HOWE.
FISHING REEL AND REEL REST.
(Application filed Nov. 22, 1899.)
(No Model.) 2 Sheets—Sheet 2.
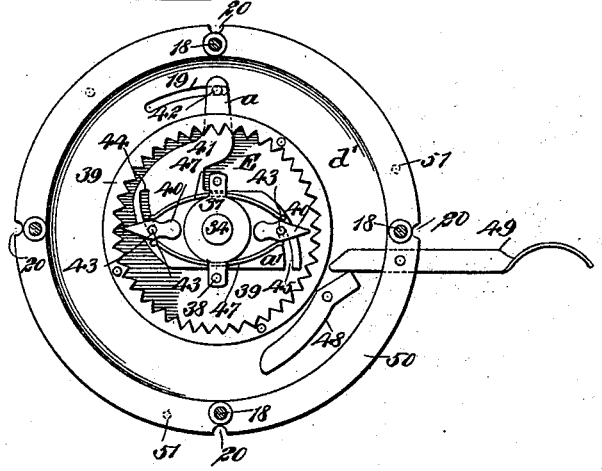
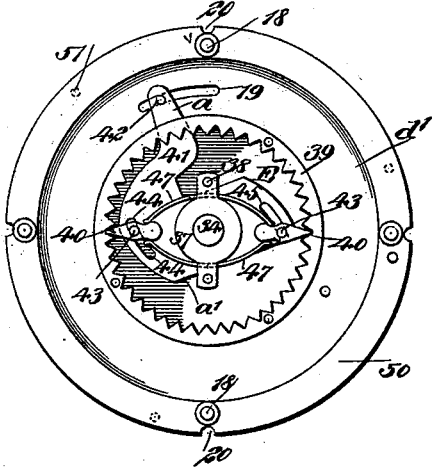
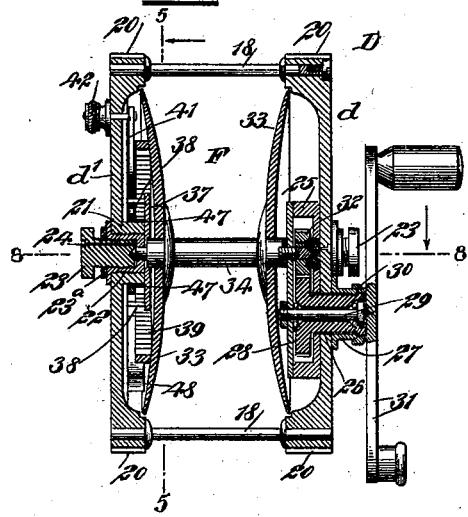
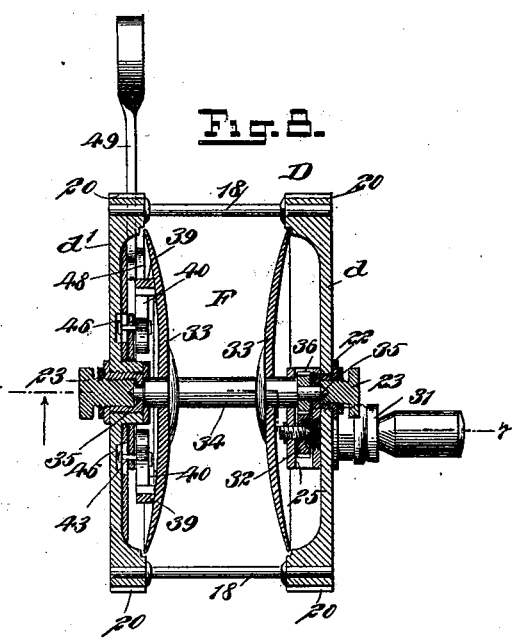
WITNESSES
INVENTOR
Jasper Howe
BY
ATTORNEYS

UNITED STATES PATENT OFFICE.

JASPER HOWE, OF TACOMA, WASHINGTON.

FISHING-REEL AND REEL-REST.

SPECIFICATION forming part of Letters Patent No. 646,737, dated April 3, 1900.

Application filed November 22, 1899. Serial No. 737,887. (No model.)

*To all whom it may concern:*

Be it known that I, JASPER HOWE, a citizen of the United States, and a resident of Tacoma, in the county of Pierce and State of Washington, have invented a new and Improved Fishing-Reel and Reel-Rest, of which the following is a full, clear, and exact description.

One object of my invention is to provide a reel adapted to be hung in the center of a rod instead of on the side, as is usual, so that the rod is always balanced. Therefore in reeling in the crank is also at the center of the rod, and the customary wabbling at such time is not experienced.

Another object of the invention is to provide such a connection between the pole or rod that the reel will not become loosened from the pole even when roughly used.

A further object of the invention is to construct a simple form of click which can be set hard or soft or whereby instantly a running spool can be obtained.

It is another object of the invention to substitute a brake for the ordinary drag, which brake is worked by the little finger of the hand governing the rod, enabling the angler to bring a fish under control at all times, as the line may be brought under necessary tension at any moment.

A further object of the invention is to provide means for mounting the gearing with the least possible friction, together with means for oiling the bearings in which the gearing and spool work.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
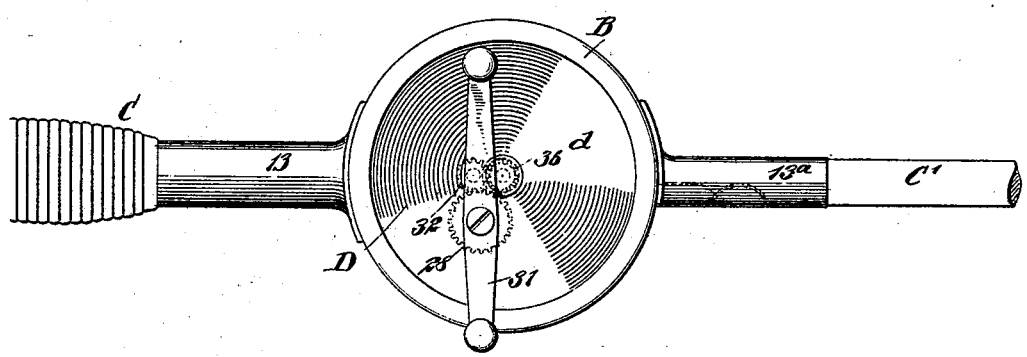
Figure 2:
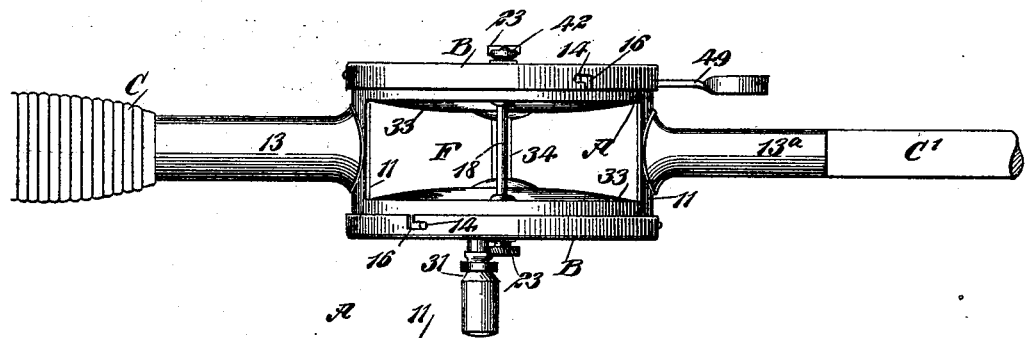
Figure 3:
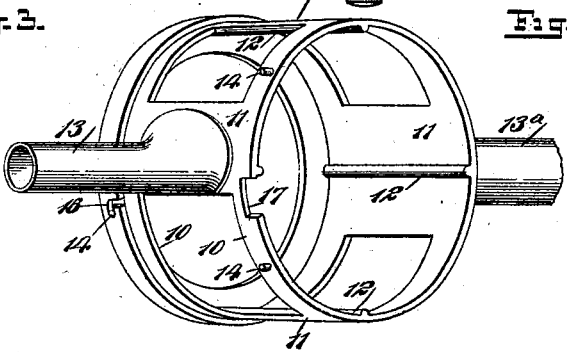
Figure 4:
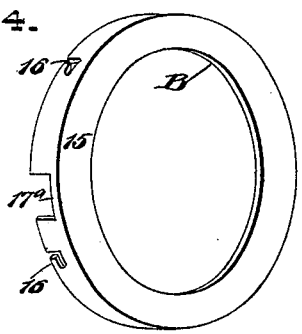

Figure 1 is a side elevation of the improved reel and that portion of the rod to which the reel is applied. Fig. 2 is a plan view of the reel and connected parts of the rod. Fig. 3 is a detail perspective view of the reel seat or frame, showing one cap in position thereon. Fig. 4 is a perspective view of the second cap of the reel seat or frame removed therefrom. Fig. 5 is a section taken substantially on the line 5 5 of Fig. 7, just in front of one of the spool-disks, illustrating the click mechanism out of operation. Fig. 6 is a view similar to Fig. 5, the click mechanism being shown in operation. Fig. 7 is a section taken on the line 7 7 of Fig. 8. Fig. 8 is a section taken practically on the line 8 8 of Fig. 7.

The reel seat or frame is of skeleton construction and is best shown in Fig. 3. It consists of a skeleton body A and caps B, removably attached to the ends of the body. In the construction of the body A two concentric rings 10 are employed, united by connecting bars or plates 11, and sundry of the said bars or plates 11 are provided with diametrical ribs 12 upon their inner faces, as is also shown in Fig. 3. Diametrically-opposing connecting bars or plates 11 carry sockets, one of the said bars or plates being provided with a socket 13, adapted to receive the butt C of the rod, while the other socket $13^a$ receives the pole-section C'. These sockets 13 and $13^a$ are located centrally with respect to the side portions of the body A, as shown in Fig. 1, so that when the seat or frame is attached to the pole it occupies a central position thereon. Each ring 10 is provided with pins 14 in order that a locking engagement may be effected between the heads of the reel seat or frame and the body. To that end each head consists of a ring 15, having an inwardly-extending marginal flange of sufficient diameter to slip over a ring 10 of the body. The marginal flanges of the heads B are provided with bayonet or angular slots 16, adapted to receive the pins 14, and one of the rings 10 of the body is provided with a recess 17, adapted to register with a similar recess $17^a$, made in the head provided for that end of the body, as shown in Figs. 3 and 4.

The reel proper consists of a frame D, and this frame comprises two disks $d$ and $d'$, spaced at a suitable distance apart, and the said disks are connected by cross-bars 18. Both disks of the reel-frame D are provided with recesses 20 in their periphery, which recesses receive the ribs 12 on the reel rest or frame when the reel-frame D is placed in said rest. The disk $d'$ at the left-hand disk and the disk $d$ the right-hand one. Each of these disks is provided with a hub 21, but one hub may be of greater length than the other, and the hubs 21 are interiorly threaded in order that they may receive bushings 22, the inner ends of which are closed with the exception of a central aperture, their outer ends being provided with flanges. Set-screws 23 are screwed into the bushings 22, and suitable jam-nuts 23ª are employed in connection with the said set-screws. Furthermore, each set-screw 23 is provided with an oil-duct 24, produced therein, extending through from end to end.

On the inner face of the right-hand disk $d$ of the reel-frame a box-casing 25 of any approved character is constructed, and this box-casing is provided with an opening in its outer side in registry with an opening 26 in the right-hand disk $d$ of the said frame D, as is shown best in Fig. 7, and a sleeve 27 is secured upon the outer face of the disk $d$ around the opening 26, as is also shown in Fig. 7. A gear 28 is located in the said casing 25, being mounted to turn on a roller-bearing spindle 29, and the gear 28 is provided with a hub which extends out through and beyond the sleeve 27. The hub of the gear 28 is attached by a suitably-threaded flange 30 to a crank 31, as is also best shown in Fig. 7. The gear 28 meshes with a pinion 32, also located in the casing 25, which pinion shows best in Fig. 1.

A spool F is mounted to turn in the reel-frame D, and this spool consists of opposing disks 33, the outer faces whereof are preferably concaved or dished, as shown in Figs. 7 and 8, and these disks 33 are secured firmly upon a shaft 34, provided with reduced trunnions or ends 35, which are conical at their extremities and enter similarly-shaped openings in the set-screws 23, as shown in Fig. 8. At the right-hand end of the spool-shaft 34 a pinion 36 is secured to the said shaft, the pinion being located within the casing 25, and this pinion 36 meshes with the pinion 32, as illustrated in Fig. 1.

A cap 37 is located at the inner end of the hub of the left-hand disk $d'$ of the reel-frame, as shown in Figs. 5, 6, and 7, and the spool-shaft 34 passes through this cap, which is in the nature of a disk having opposing peripheral extensions, and pins 38 are secured to these extensions and to the inner face of the said disk $d'$ of the reel-frame. An internally-toothed ratchet-wheel 39 is secured in any suitable or approved manner to the inner face of the left-hand disk or head of the spool F, the teeth of which ratchet-wheel are adapted to be engaged by pawls 40, pivoted upon a click-lever 41, which lever is of angular construction, comprising a body member $a'$, which is pivoted on the shaft 34, and a member $a$, which extends beyond the outer periphery of the ratchet-wheel. This latter member $a$ of the click-lever is provided with a pin 42, which extends out through a curved slot 19, produced in the disk or head $d'$ of the reel-frame, and the outer end of the pin carries a suitable knob, whereby the member $a$ of the click-lever may be moved the length of the slot 19. When the pin 42 is at one end of the slot 19, as shown in Fig. 5, the pawls 40 are carried totally out of engagement with the ratchet-wheel 39, but the pawls are brought into greater or less contact with the teeth of the said ratchet-wheel 39 as the outer end of the click-lever is moved in direction of the opposite end of the slot 19. The pawls are provided with attached pivot-pins 43, and these pins pass through slots 44 and 45, produced in the body portion of the said click-lever, as illustrated in Figs. 4 and 5, and the outer ends of the pins are made to enter recesses or slots 46, produced in the inner face of the head or disk $d'$ of the reel-frame. The pawls 40 are under the influence of springs 47, the springs being strap-springs bowed in opposite directions and engaged at their ends with the side edges of the pawls at opposite side edges, as shown in Figs. 5 and 6, and these springs pass through the space between the pins 38 of the cap 37 and the hub 21 of the reel-frame disk or head $d'$.

Instead of the usual drag I employ a brake-arm 48, which is pivoted to the inner face of the left-hand disk $d'$ of the reel-frame and is arranged for engagement with the periphery of the ratchet-wheel 39. The drag normally drops from engagement with the ratchet-wheel 39, but can be instantly brought into greater or lesser contact therewith by manipulating a lever 49, pivoted to the said disk or head $d'$, as shown in Figs 5 and 8, the said lever being adapted to be operated by the little finger of the hand supporting the rod, and this brake-lever is located at the left-hand side of the reel, as is clearly shown in Fig. 2. The slots 17 and 17ª, made, respectively, in the reel seat or frame and the left-hand cap therefor, permit the said lever 49 to extend out a suitable distance beyond the seat. A flat marginal flange 50 is formed at the outer face or edge of the heads or disks $d$ and $d'$ of the reel-frame D, and studs 51, of rubber or other pliable material, are located on this flange 50, adapted for engagement with the heads or caps B of the seat or frame when the reel has been placed therein, so that the reel will constantly travel true and will not wabble or rattle while in use.

Having thus described my invention, I claim as new and desire to secure by Letters Patent—

1. In a reel, a frame, a spool for operating in the frame, an internally-toothed ratchet-wheel secured to the spool, a lever movable in the frame, and two dogs movable into and out of engagement with said wheel by said lever.

2. In a fishing-rod, a reel seat or frame, having a removable cap and interior diametric ribs, and means for locking the cap to the body of the said reel seat or frame, as described.

3. A reel seat or frame for a fishing-rod, comprising a body having centrally-located sockets extending from opposite sides, caps having flanges for engaging over the body, and pins on the body for engaging in bayonet-slots in the flanges.

4. In a reel for fishing-rods, a seat or frame having sockets projected in opposite directions from its central portion and provided with interiorly-located ribs, and a reel-frame containing a spool, the said reel-frame being recessed to receive the ribs on the said seat or frame.

5. In a fishing-reel, a reel-frame, a spool mounted in the said frame, an internally-toothed ratchet-wheel carried by the spool, a lever mounted to swing relatively to the spool, means for operating said lever from the exterior of the frame, pawls carried by the said lever, adapted for engagement with the teeth of the ratchet-wheel, the pawls being so arranged that when the lever is moved to its full extent in one direction the said pawls will be brought into the aforesaid engagement with the teeth of the ratchet-wheel, and when the lever is moved to its full extent in an opposite direction the said pawls will be carried entirely out of engagement with the said ratchet-wheel.

In testimony whereof I have signed my name to this specification in the presence of two subscribing witnesses.

JASPER HOWE.

Witnesses:
ELLIS LEWIS GARRETSON,
HIRAM F. GARRETSON.